No. 652,752. Patented July 3, 1900.
J. A. DALY.
LINING OR COATING VULCANIZED PLATES WITH METAL.
(Application filed Aug. 8, 1899.)
(No Model.)
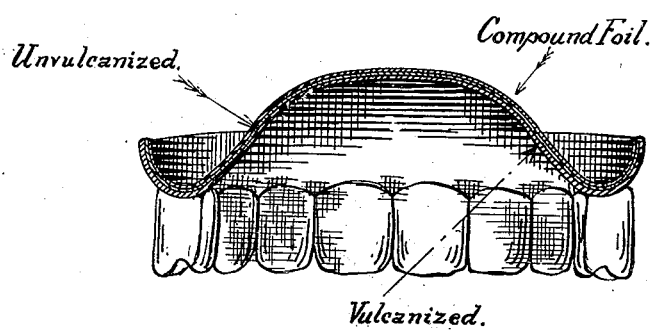
Witnesses
Chas. K. Davis
M. E. Brown
Inventor
J. A. Daly
By W. H. Bartlett
Attorney

UNITED STATES PATENT OFFICE.

JOHN A. DALY, OF WASHINGTON, DISTRICT OF COLUMBIA.

LINING OR COATING VULCANIZED PLATES WITH METAL.

SPECIFICATION forming part of Letters Patent No. 652,752, dated July 3, 1900.

Application filed August 8, 1899. Serial No. 726,569. (No specimens.)

*To all whom it may concern:*

Be it known that I, JOHN A. DALY, a citizen of the United States, residing at Washington, in the District of Columbia, have invented certain new and useful Improvements in Lining or Coating Vulcanized Plates with Metal, of which the following is a specification, reference being had therein to the accompanying drawing.

This invention relates to a method of lining or covering the whole or a part of vulcanized dental plates or similar articles with a metallic lining or covering.

The object of this invention is to provide a cheaper method of lining or covering vulcanized plates than that described in my application Serial No. 678,266, filed April 20, 1898, for lining dental plates. In said application the salient feature of improvement consists in filling the spongy face of a foil having one spongy face with a vulcanizable compound and vulcanizing the same onto a previously-vulcanized plate.

The drawing illustrates a section of a dental plate somewhat exaggerated as to proportions, showing the arrangement of layers prior to the final vulcanization.

The patent to Starr, No. 413,376, of October 22, 1889, describes a method of lining dental plates with a compound foil consisting of a sheet of silver foil or leaf united to a sheet of gold foil or leaf. This "silver-gold" foil was placed with the silver side in contact with the rubber in the vulcanizer and the whole then vulcanized. "The attack of the sulfur in the rubber compound on the silver of the compound foil" is supposed to turn the silver into a sulfid, which forms a mechanical union with the gold and with the rubber and unites the two together. The said Starr claims "the improvement in the art of lining rubber dental plates which consists in applying a compound foil to the rubber prior to vulcanization and uniting it thereto by converting the silver into a sulfid during the vulcanizing process, substantially as described."

The patent to Barnes, No. 348,183, of August 31, 1883, describes a compound metallic foil, one face being gold, the other tin, which may be electrodeposited on the gold, in which case the tin will be porous or spongy. A layer of gutta-percha is used to attach the tinned side of the compound foil to the rubber dental plate, and the whole is vulcanized together. As stated in the patent and as explained by Mr. Barnes, the foil was placed on the rubber prior to vulcanization.

In certain abandoned applications for patent filed by me some fifteen years prior to the present application I described a compound foil made from a sheet of gold-foil and having one roughened surface made by attaching particles of bronze or metallic powder to the gold-foil by solder or the like or a surface of solder. From this it will appear that I am well aware that a compound foil having one surface of gold and the other surface of a baser metal or material is not new. Such a compound foil of any known or usual construction I do not herein claim; but such may be used with my present invention.

The objection to the coating of a dental plate with a compound foil having one gold face and one baser face has heretofore been that the large amount of sulfureted hydrogen or other gas developed from the prepared rubber in vulcanizing would frequently wholly destroy the baser metal, leaving the gold film unattached or but slightly attached to the plate. Again, as a dental plate is not of uniform thickness some parts of the plate develop more of the solvent gases than do other parts and the base metal is more eaten away at one part than at another, producing plates which soon lose their linings or coverings in spots, if they are not spotted when removed from the vulcanizer. I overcome these objections to the use of compound foils as a lining or covering for vulcanized rubber plates in the following manner:

I make a complete rubber dental or similar vulcanized plate by any of the usual processes, or I take any common rubber dental or similar vulcanized rubber plate which may have been made and used for years. If the plate is in any manner impure I treat it with alkali or other chemical agent, either cold or hot, and dry the plate, so that the plate is clean and sweet. I then cover such parts of the vulcanized rubber plate as are to be covered with metal with a thin coating of vulcanizable rubber, gutta-percha, or the like. This may be laid on with a brush, if in liquid form, or a thin sheet of the dry material may be laid on the plate, or, as an equivalent step, the vulcanizable material may be applied as a coating to the baser-metal face of the compound foil. The base-metal face of the compound foil is then placed on the vulcanized plate and rubbed down thereon. The stickiness of the unvulcanized material will attach the foil to the plate, and then the plate and coating may be simply embedded in a mass of soft or wet plaster-of-paris, no prepared mold being necessary—that is, the dental or other plate may be put in a vulcanizer and plaster poured around it and allowed to harden. When the plaster has set, the vulcanizer, with its inclosed contents, is exposed to the usual vulcanizing heat for a few minutes. With a "silver-gold" foil one to three minutes will usually be sufficient. With a "gold-tin" foil three to ten minutes may suffice. With nickel or bronze on gold different periods of time will be necessary, although no great damage will occur if the time be longer than the periods mentioned. The time required for vulcanization is much less than that usually required to vulcanize a plate. The previously-vulcanized plate throws off very little of the solvent gases, and this gas may generally be ignored. The thin coating of vulcanizable material throws off gas which attacks the base metal or baser face of the foil and eats into or roughens it or renders it porous. As the quantity of gas thrown off from the thin film is small, it does not wholly destroy the base metal or baser face of the foil. Moreover, as the vulcanizable coating is of a practically-uniform thickness the gases attack all parts of the base metal or base face of the foil about alike, and a spotted result is avoided. When the vulcanization is complete, the plate is removed from the vulcanizer and the plaster broken away. The baser metal will have become porous, partially disintegrated, or partially transformed into a sulfid, and the cement layer interposed between the foil and the previously-vulcanized plate will have become vulcanized to both plate and foil, making a very firm union which is practically uniform throughout the coated surface, owing to the uniform thickness of the coating or attaching material which forms the bond of union between the foil and the plate and the short time of the second or lining vulcanization.

The distinction I have endeavored to make clear between the present process and various old and known processes is that heretofore the foil has been attached to the material to be vulcanized before vulcanization and was unequally acted on by the gases developed in vulcanization of different thicknesses of material, and the baser metal was frequently entirely destroyed in patches by the large amount of gases so developed, whereas in the present process the main part of the vulcanization of the plate has been done before the foil was applied, and the very slight development of gas from a revulcanization of such vulcanized plate is not very material. The slight and uniform development of gas from the thin coating or sheet I apply is insufficient to destroy the base-metal layer of the foil, but is sufficient to either roughen or chemically change the base metal, and the vulcanization firmly unites the foil to the plate, as stated.

It is within the contemplation of my invention that the baser foil may be attached to the vulcanized plate in the manner described, and the gold film may be afterward deposited thereon by electrodeposition. When this is burnished down, a fairly-sound face of gold can be produced.

What I claim is—

1. The method of attaching a compound foil to a dental or similar rubber plate, which consists in inclosing a limited quantity of coating or vulcanizable material between a previously-vulcanized plate and the baser-metal face of a metal foil or film, and developing by the heat of vulcanization a gas which attacks and partially destroys or changes such baser-metal face, thereby causing the attachment of the foil to the plate, substantially as described.

2. The method of covering a vulcanized dental plate with a foil which consists in cleansing the plate by means of a chemical agent, attaching a foil having a comparatively base metal face to the plate by means of a thin layer of unvulcanized material interposed between the vulcanized plate and the base-metal face of the foil, embedding the whole in soft plaster, and vulcanizing, all substantially as described.

In testimony whereof I affix my signature in presence of two witnesses.

JOHN A. DALY.

Witnesses:
W. A. BARTLETT,
S. A. TERRY.